United States Patent
Jallon

(10) Patent No.: US 9,643,068 B2
(45) Date of Patent: May 9, 2017

(54) SYSTEM AND METHOD FOR OBSERVING THE SWIMMING ACTIVITY OF A PERSON

(75) Inventor: Pierre Jallon, Grenoble (FR)

(73) Assignees: Commissariat A L'energie Atomique et Aux Energies Alternatives, Paris (FR); Movea SA, Grenoble (FR)

( * ) Notice: Subject to any disclaimer, the term of this patent is extended or adjusted under 35 U.S.C. 154(b) by 1555 days.

(21) Appl. No.: 13/260,510

(22) PCT Filed: Mar. 29, 2010

(86) PCT No.: PCT/EP2010/054133
§ 371 (c)(1),
(2), (4) Date: Dec. 5, 2011

(87) PCT Pub. No.: WO2010/112470
PCT Pub. Date: Oct. 7, 2010

(65) Prior Publication Data
US 2012/0072165 A1    Mar. 22, 2012

(30) Foreign Application Priority Data
Mar. 31, 2009  (FR) ..................... 09 52017

(51) Int. Cl.
- *A63B 69/00* (2006.01)
- *G06K 9/00* (2006.01)
- *A63B 24/00* (2006.01)
- *A63B 71/06* (2006.01)

(52) U.S. Cl.
CPC .......... *A63B 69/00* (2013.01); *G06K 9/00355* (2013.01); *A63B 2024/0056* (2013.01); *A63B 2024/0071* (2013.01); *A63B 2071/0647* (2013.01); *A63B 2220/40* (2013.01); *A63B 2220/836* (2013.01); *A63B 2244/20* (2013.01)

(58) Field of Classification Search
CPC ....................................................... A63B 69/00
USPC ........................................................ 702/141
See application file for complete search history.

(56) References Cited

U.S. PATENT DOCUMENTS

| 4,654,010 A * | 3/1987 | Havriluk | A63B 24/00 310/337 |
| 5,663,897 A * | 9/1997 | Geiser | A63B 71/0686 441/56 |
| 2010/0210975 A1* | 8/2010 | Anthony, III | A61B 5/0002 600/595 |

FOREIGN PATENT DOCUMENTS

WO    WO 2008/032315 A1    3/2008

OTHER PUBLICATIONS

Guenterberg et al. "A Distributed Hidden Markov Model for Fine-grained Annotation in Body Sensor Networks." BSN (2009).*

(Continued)

*Primary Examiner* — John Breene
*Assistant Examiner* — Jeffrey C Morgan
(74) *Attorney, Agent, or Firm* — Stroock & Stroock & Lavan LLP

(57) ABSTRACT

A system for observing a swimming activity of a person includes a waterproof housing (BET) having a motion sensor (MS), and is furnished with fixing means (BEL) for securely fastening the housing (BET) to a part of the body of a user. The system has analysis means (AN) for analyzing the signals transmitted by the motion sensor (MS) to at least one measurement axis and which are adapted for determining the type of swimming of the user as a function of time by using a hidden Markov model with N states corresponding respectively to N types of swimming.

16 Claims, 3 Drawing Sheets

(56) References Cited

OTHER PUBLICATIONS

International Search Report and Written Opinion dated Sep. 20, 2010, issued in counterpart International Application No. PCT/EP2010/054133.

* cited by examiner

SYSTEM AND METHOD FOR OBSERVING THE SWIMMING ACTIVITY OF A PERSON

CROSS-REFERENCE TO RELATED APPLICATIONS

This application is the National Stage under §371 of International Application No. PCT/EP2010/054133, filed on Mar. 29, 2010, which claims priority to French Application No. 0952017, filed on Mar. 31, 2009, the contents of both of which are incorporated herein by reference.

FIELD OF THE INVENTION

The present invention pertains to a system and a method for observing a swimming activity of a person.

BACKGROUND OF THE INVENTION

There exist systems for calculating the distance swum on the basis of measurements transmitted by a motion sensor fastened to the swimmer, such as that disclosed in the patent document WO 2004/038336 (Clothing Plus OY).

However, such systems perform only observation or quantitative monitoring of the swimming activity of a person, and in no case is qualitative analysis of the swimming types employed.

SUMMARY OF THE INVENTION

Embodiments of the present invention are aimed at allowing an analysis of a swimming activity of a person, making it possible to differentiate the types of swimming performed in the course of time, which may be particularly useful to a swimmer wishing to track his progress and his training, for example with a view to competitions.

Hence, there is proposed, according to one aspect of the invention, a system for observing a swimming activity of a person, comprising a waterproof housing comprising a motion sensor, and furnished with fixing means for securely fastening the housing to a part of the body of a user. The system comprises analysis means for analyzing the signals transmitted by the motion sensor to at least one measurement axis and which are adapted for determining the type of swimming of the user as a function of time by using a hidden Markov model with N states corresponding respectively to N types of swimming.

It is thus possible to analyze, in the course of time, the various types of swimming employed by the user of the system. The latter, or another person, can thus observe the evolutionary trends and progress of the swimmer, and compile comparative statistics between various swimming sessions, or within one and the same session.

In one embodiment, said motion sensor comprises an accelerometer or a gyrometer or a magnetometer.

According to one embodiment, the system comprises, furthermore, a low-pass filter of cutoff frequency lying between 0.5 Hz and 5 Hz.

In one embodiment, said fixing means are adapted for securely fastening the housing to the wrist, to the ankle, to the neck or to the head of the user.

Thus the system can limit the noise generated by the shocks measured such as the shocks measured when the hand bearing the waterproof housing enters the water.

In one embodiment, the probability density $p_x(\underline{x}(n))$ of correspondence between the signals delivered by the motion sensor and a state of the hidden Markov model representing a type of swimming is defined by the following expression:

$$\frac{1}{\sqrt{2\pi|\Sigma|}} \cdot e^{\frac{(\underline{x}(n)-\underline{\mu})^T \Sigma^{-1}(\underline{x}(n)-\underline{\mu})}{2}}$$

in which:

$\underline{x}(n)$ represents the column vector with components of the axial measurements of the motion sensor at the sample of index n;

$\underline{\mu}$ represents a column vector with a number of components being the number of measurement axes of the motion sensor, representative of the state of the hidden Markov model corresponding to said swimming; and $|\Sigma|$ represents the absolute value of the determinant of a diagonal matrix $\Sigma$ with dimension the number of measurement axes of the motion sensor and representative of the state of the hidden Markov model corresponding to said swimming.

The use of a hidden Markov model such as this makes it possible to accurately distinguish the type of swimming employed.

According to one embodiment, the analysis means are adapted for determining the type of swimming of the user from among a set of at least two swimming strokes from among breaststroke, crawl, butterfly, and backstroke.

Thus, the invention makes it possible to distinguish any swimming stroke from among these conventional swimming strokes.

For example, said motion sensor may comprise a triaxial accelerometer with the waterproof housing being fastened securely to the wrist of the user, the three axes of said accelerometer, forming a right-handed trihedron, such that:

the direction of the first axis is the longitudinal axis of the forearm of the wrist to which the housing is fastened and is oriented toward the elbow; and the third axis is vertically oriented downwards, when the forearm of the wrist to which the housing is fastened is in a horizontal plane, the palm of the hand of the wrist to which the housing is fastened being directed downwards, and said housing being disposed on the outer face of the wrist.

In one embodiment, for breaststroke, the three components $\mu_1$, $\mu_2$, $\mu_3$ of the column vector $\underline{\mu}$ are such that $\mu_1 \in [-0.45;-0.20]$, $\mu_2 \in [0.1;0.5]$, and $\mu_3 \in [-0.8;0.45]$, and the three diagonal components $\Sigma_1$, $\Sigma_2$, $\Sigma_3$ of the diagonal matrix $\Sigma$ are such that $\Sigma_1 \in [0.1, 0.18]$, $\Sigma_2 \in [0.2;0.6]$, and $\Sigma_3 \in [0.03;0.2]$.

According to one embodiment, for crawl, the three components $\mu_1$, $\mu_2$, $\mu_3$ of the column vector $\underline{\mu}$ are such that $\mu_1 \in [-0.7;-0.8]$, $\mu_2 \in [-0.25;-0.45]$, and $\mu_3 \in [0.4;0.2]$, and the three diagonal components $\Sigma_1$, $\Sigma_2$, $\Sigma_3$ of the diagonal matrix $\Sigma$ are such that $\Sigma_1 \in [0.2;0.3]$, $\Sigma_2 \in [0.1;0.3]$, and $\Sigma_3 \in [0.07;0.5]$.

In one embodiment, for butterfly, the three components $\mu_1$, $\mu_2$, $\mu_3$ of the column vector $\underline{\mu}$ are such that $\mu_1 \in [-0.8,0.1]$, $\mu_2 \in [0.45;0.5]$, and $\mu_3 \in [-0.2;0.4]$, and the three diagonal components $\Sigma_1$, $\Sigma_2$, $\Sigma_3$ of the diagonal matrix $\Sigma$ are such that $\Sigma_1 \in [0.2;0.4]$, $\Sigma_2 \in [0.1;0.5]$, and $\Sigma_3 \in [0.2;0.8]$.

According to one embodiment, for backstroke, the three components $\mu_1$, $\mu_2$, $\mu_3$ of the column vector $\underline{\mu}$ are such that $\mu_1 \in [-0.2;0.1]$, $\mu_2 \in [0.3;0.7]$, and $\mu_3 \in [0.05;0.4]$, and the three diagonal components $\Sigma_1$, $\Sigma_2$, $\Sigma_3$ of the diagonal matrix $\Sigma$ are such that $\Sigma_1 \in [0.2;0.4]$, $\Sigma_2 \in [0.1;0.5]$, and $\Sigma_3 \in [0.2;0.8]$.

In one embodiment, the probabilities P, of said hidden Markov model, of switching between two states representing respectively a type of swimming are such that:
P(state$_i$,state$_j$)∈[0.8;0.9999], when i is different from j; and
P(state$_i$,state$_j$)∈[0.0001;0.2], when i is equal to j.

Thus, the accuracy of the system is improved.

According to one embodiment, said analysis means are internal or external to the housing, and the triaxial accelerometer comprises wired or wireless transmission means for transmitting its measurements to said analysis means.

Thus, numerous embodiments may be envisaged.

In one embodiment, the system comprises display means fixed to the housing and/or remote display means.

Thus, the results of analyzing the swimming activity of the user may be viewed by the swimmer directly, or indeed analyzed and viewed on a larger external screen, for example of a laptop computer which can comprise the analysis means.

According to another aspect of the invention, there is also proposed a method for observing a swimming activity of a person, on the basis of measurements transmitted by a motion sensor fixed in a waterproof manner to a part of the body of the user, characterized in that the signals transmitted by the motion sensor to at least one measurement axis are analyzed to determine the type of swimming of the user as a function of time by using a hidden Markov model with N states corresponding respectively to N swimming types.

BRIEF DESCRIPTION OF THE DRAWINGS

The invention will be better understood on studying a few embodiments described by way of wholly non-limiting examples and illustrated by the appended drawings in which.

DETAILED DESCRIPTION OF THE INVENTION

In all the figures, the elements having the same references are similar. In the examples which follow, the motion sensor comprises a triaxial accelerometer, but the invention applies to a motion sensor comprising a gyrometer or a magnetometer.

Figure 1:
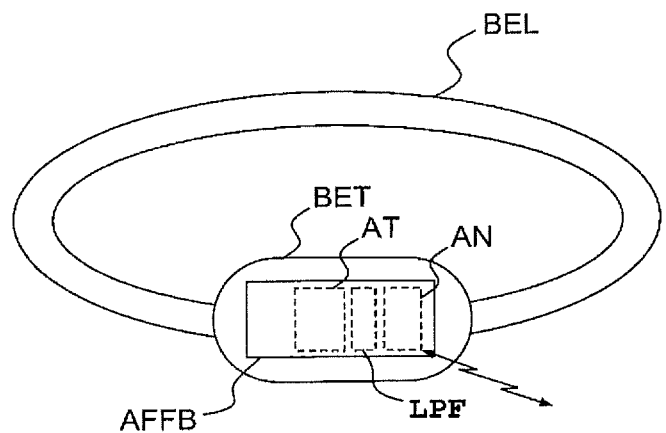
FIGS. 1 and 2 illustrate two embodiments of systems according to one aspect of the invention.

As illustrated in FIG. 1, an embodiment system for observing a swimming activity of a person comprises a waterproof housing BET comprising a triaxial accelerometer AT. The system comprises fixing means for securely fastening the housing to a part of the body of a user, in particular to the wrist, to the ankle, to the neck or to the head of a user, in this instance by means of an elastic bracelet BEL.

The system comprises a module AN for analyzing the signals transmitted by the triaxial accelerometer AT and adapted for determining the type of swimming of the user as a function of time by using a hidden Markov model with N states corresponding respectively to N types of swimming.

The system also comprises an optional low-pass filter LPF, of cutoff frequency lying between 0.5 Hz and 5 Hz, making it possible to limit the noise generated by the shocks measured, notably when the hand bearing the waterproof housing enters the water.

An optional display screen AFFB fixed to the housing BET, can allow the user of the system to view the results in a manner appropriate to the reduced size of the screen. The analysis module AN can also transfer, in real time or subsequently, by a wire-based or wireless link, the results to be displayed to a computer comprising a screen of much greater size, allowing improved viewing of the results. Of course, the analysis module comprises a memory for storing the results, notably so as to be able to transmit them subsequently if necessary.

Figure 2:
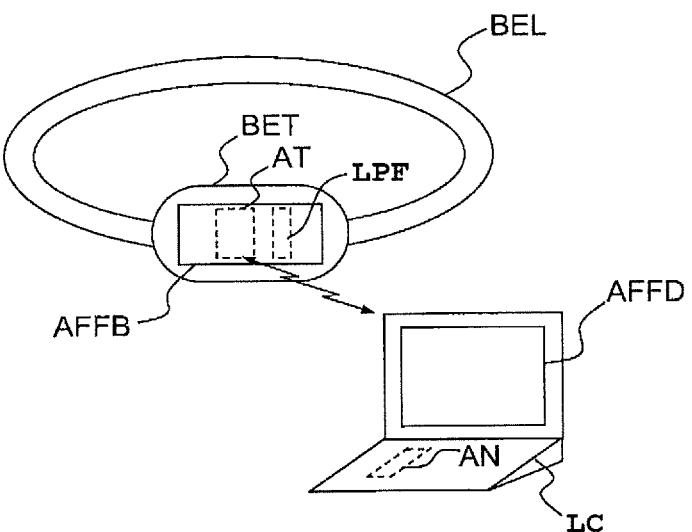

As a variant, such as illustrated in FIG. 2, the analysis module AN is outside the waterproof housing BET, it is for example built into a laptop computer LC.

In the description hereinbelow, the wholly non-limiting example dealt with is a system according to one aspect of the invention, in which the analysis module AN is adapted for determining the type of swimming of the user as a function of time by using a hidden Markov model with 3 states (N=3) corresponding respectively to breaststroke (state 1), crawl (state 2) and backstroke (state 3).

In this example, the three signals emitted by the triaxial accelerometer AT, corresponding respectively to the accelerations measured on each of the three measurement axes, are acquired at a frequency of 200 Hz, and then sliced into successive time intervals of 0.5 s over which an average is calculated. Thus a signal sampled at 2 Hz at the input of the analysis module AN is obtained.

These signals are denoted in the form of a three-dimensional vector: $\underline{x}(n)=[x_1(n), x_2(n), x_3(n)]^T$, in which n represents the index of the sample at the frequency of 2 Hz, and $x_1$, $x_2$, and $x_3$ represent the values of the signals corresponding to the three measurement axes.

The probability density $P_x$ of the vector $\underline{x}(n)$ is approximated by a Gaussian law of dimension 3, whose parameters depend on the type of swimming considered:

$$P_x(\underline{x}(n)) = \frac{1}{\sqrt{2\pi|\Sigma|}} \cdot e^{-\frac{(\underline{x}(n)-\underline{\mu})^T \Sigma^{-1}(\underline{x}(n)-\underline{\mu})}{2}}$$

in which:

$\underline{x}(n)$ represents the column vector with components the three axial measurements of the triaxial accelerometer at the sample of index n;

$\underline{\mu}$ represents a three-component column vector representative of the state of the hidden Markov model corresponding to said swimming; and $|\Sigma|$ represents the absolute value of the determinant of a diagonal matrix $\Sigma$ of dimension 3 representative of the state of the hidden Markov model corresponding to said swimming.

In this example, the three axes of the accelerometer AT, form a right-handed trihedron, and are such that:

the direction of the first axis is the longitudinal axis of the forearm of the wrist to which the housing BET is fastened and is oriented toward the elbow; and the third axis is vertical oriented downwards, when the forearm of the wrist to which the housing BET is fastened is in a horizontal plane, the palm of the hand of the wrist to which the housing BET is fastened being directed downwards, and said housing BET being disposed on the outer face of the wrist.

The three swimming strokes of the example considered are defined with the following parameters:

breaststroke (state 1 of the hidden Markov model):

$$\underline{\mu} = [-0.3; 0; -0.70]^T \text{ and } \Sigma = \begin{bmatrix} 0.05 & 0 & 0 \\ 0 & 0.30 & 0 \\ 0 & 0 & 0.10 \end{bmatrix}$$

crawl (state 2 of the hidden Markov model):

$$\underline{\mu} = [-0.765; -0335; -0.4595]^T \text{ and } \Sigma = \begin{bmatrix} 0.20 & 0 & 0 \\ 0 & 0.15 & 0 \\ 0 & 0 & 0.10 \end{bmatrix}$$

backstroke (state 3 of the hidden Markov model):

$$\underline{\mu} = [-0.10; 0.40; 0]^T \text{ and } \Sigma = \begin{bmatrix} 0.20 & 0 & 0 \\ 0 & 0.20 & 0 \\ 0 & 0 & 0.50 \end{bmatrix}$$

The probability densities of switching $P(\text{state}_i/\text{state}_j)$ from a state $\text{state}_i$ corresponding to a swimming of the hidden Markov model to another state $\text{state}_j$ corresponding to a swimming of the hidden Markov model are the following, chosen so as to ensure good stability of the system:

| $P(\text{state}_i/\text{state}_j)$ | $\text{state}_i = 1$ (breaststroke) | $\text{state}_i = 2$ (crawl) | $\text{state}_i = 3$ (backstroke) |
|---|---|---|---|
| $\text{state}_j = 1$ (breaststroke) | 0.999 | 0.0005 | 0.0005 |
| $\text{state}_j = 2$ (crawl) | 0.0005 | 0.999 | 0.0005 |
| $\text{state}_j = 3$ (backstroke) | 0.0005 | 0.0005 | 0.999 |

The analysis module AN determines, on the basis of the input signals and of the hidden Markov model such as defined, the most probable sequence of states (swimming strokes), according to conventional methods, for example by calculating for the set of possible sequences of states the associated probability having regard to the signal observed and by retaining the most probable sequence, such as are described for example in the document "An introduction to hidden Markov models" by L. R. Rabiner and B. H. Juang, IEEE ASSP Magazine, January 1986, or in the book "Inference in Hidden Markov Models" by Cappé, Moulines and Ryden from Springer, from the series "Springer series in statistics".

Figure 3:
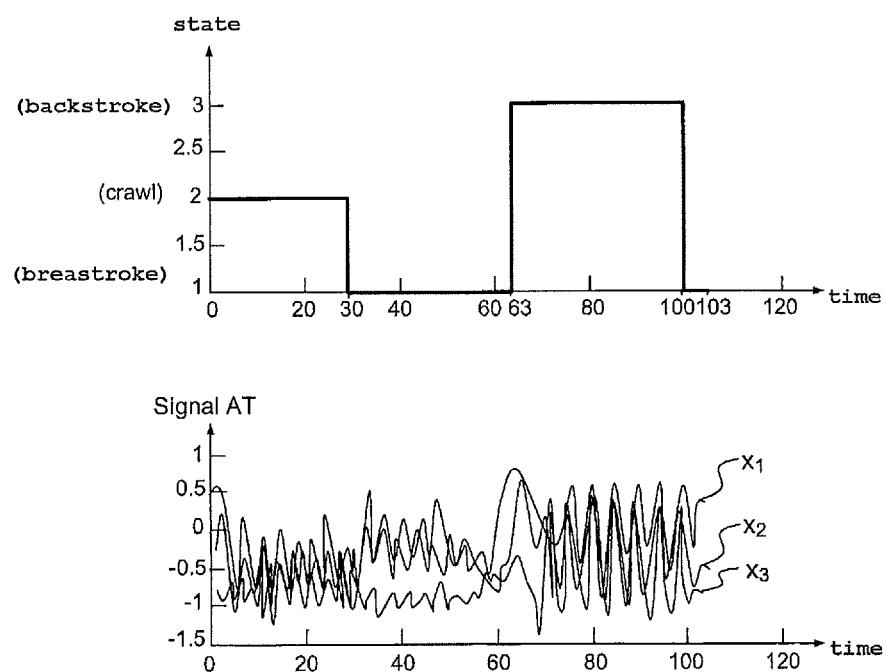
FIGS. 3 and 4 illustrate two examples of results of a system according to one aspect of the invention.

FIG. 3 illustrates an exemplary recording of a swimming session of a user of the system, on the lower graph, and the result provided by the system which indicates that the swimmer has swum the crawl for 30 seconds, and then breaststroke for 33 seconds, and then backstroke for 37 seconds.

Figure 4:
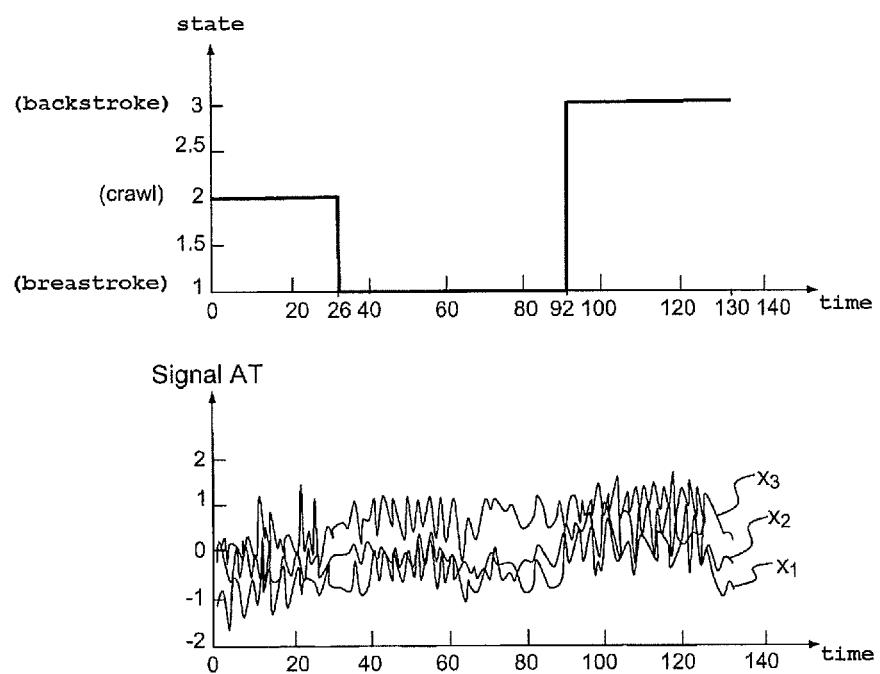

FIG. 4 illustrates another exemplary recording of a swimming session of a user of the system, on the lower graph, and the result provided by the system which indicates that the swimmer has swum the crawl for 26 seconds, and then breaststroke for 66 seconds, and then backstroke for 38 seconds.

The present invention makes it possible, at reduced cost, to allow a swimmer to record and to monitor in real time or subsequently his swimming session, accurately determining the succession of swimming types that he has undertaken during his session.

The invention claimed is:

1. A system for observing a swimming activity of a person, comprising a waterproof housing comprising a motion sensor, and furnished with fixing means for securely fastening the housing to a part of the body of a user, characterized in that the system further comprises analysis means for analyzing signals provided by the motion sensor for at least one measurement axis of the motion sensor and which is configured to determine a type of swimming of the user as a function of time by using a hidden Markov model with N states corresponding respectively to N types of swimming, the model being characterized by a column vector μ and a diagonal matrix Σ, both of which are representative of a state of the hidden Markov model corresponding to said swimming and having dimensions equal to the number of measurement axes of the motion sensor.

2. The system as claimed in claim 1, wherein said motion sensor comprises at least one of an accelerometer, a gyrometer and a magnetometer.

3. The system as claimed in claim 1, further comprising a low-pass filter having a cutoff frequency between 0.5 Hz and 5 Hz.

4. The system as claimed in claim 3, wherein a probability density $p_x(\underline{x}(n))$ of correspondence between the signals delivered by the motion sensor and a state of the hidden Markov model representing a type of swimming is defined by the following expression:

$$\frac{1}{\sqrt{2\pi|\Sigma|}} \cdot e^{-\frac{(\underline{x}(n)-\underline{\mu})^T \Sigma^{-1} (\underline{x}(n)-\underline{\mu})}{2}}$$

in which
  $\underline{x}$ represents a column vector with components of axial measurements of the motion sensor at a sample of index n; and
  $|\Sigma|$ represents the absolute value of the determinant of the diagonal matrix Σ.

5. The system as claimed in claim 4, wherein said motion sensor comprises a triaxial accelerometer and the waterproof housing is fastened to a wrist of the user, the three axes of said accelerometer forming a right-handed trihedron, such that:
  a direction of the first axis is a longitudinal axis of the forearm of the wrist to which the housing is fastened and is oriented toward the elbow; and
  a third axis is vertically oriented downwards when the forearm of the wrist to which the housing is fastened is in a horizontal plane, the palm of the hand of the wrist to which the housing is fastened being directed downwards, and said housing being disposed on the outer face of the wrist.

6. The system as claimed in claim 5, wherein for breaststroke the three components $\mu_1, \mu_2, \mu_3$ of the column vector $\underline{\mu}$ are such that $\mu_1 \in [-0.45;-0.20]$, $\mu_2 \in [-0.1;0.5]$, and $\mu_3 \in [-0.8;0.45]$, and the three diagonal components $\Sigma_1, \Sigma_2, \Sigma_3$ of the diagonal matrix Σ are such that $\Sigma_1 \in [0.1,0.18]$, $\Sigma_2 \in [0.2;0.6]$, and $\Sigma_3 \in [0.03;0.2]$.

7. The system as claimed in claim 5, wherein for crawl the three components $\mu_1, \mu_2, \mu_3$ of the column vector $\underline{\mu}$ are such that $\mu_1 \in [-0.7;-0.8]$, $\mu_2 \in [-0.25;-0.45]$, and $\mu_3 \in [-0.4;0.2]$, and the three diagonal components $\Sigma_1, \Sigma_2, \Sigma_3$ of the diagonal matrix $\Sigma$ are such that $\Sigma_1 \in [0.2;0.3]$, $\Sigma_2 \in [0.1;0.3]$, and $\Sigma_3 \in [0.07;0.5]$.

8. The system as claimed in claim 5, wherein for butterfly the three components $\mu_1, \mu_2, \mu_3$ of the column vector $\underline{\mu}$ are such that $\mu_1 \in [-0.8;0.1]$, $\mu_2 \in [-0.45;0.5]$, and $\mu_3 \in [-0.2;0.4]$, and the three diagonal components $\Sigma_1, \Sigma_2, \Sigma_3$ of the diagonal matrix E are such that $\Sigma_1 \in [0.2;0.4]$, $\Sigma_2 \in [0.1;0.5]$, and $\Sigma_3 \in [0.2;0.8]$.

9. The system as claimed in claim 5, wherein for backstroke the three components $\mu_1, \mu_2, \mu_3$ of the column vector $\underline{\mu}$ are such that $\mu_1 \in [-0.2;0.1]$, $\mu_2 \in [0.3;0.7]$, and $\mu_3 \in [-0.05;0.4]$, and the three diagonal components $\Sigma_1, \Sigma_2, \Sigma_3$ of the diagonal matrix $\Sigma$ are such that $\Sigma_1 \in [0.2;0.4]$, $\Sigma_2 \in [0.1;0.5]$, and $\Sigma_3 \in [0.2;0.8]$.

10. The system as claimed in claim 5, wherein probabilities $P(\text{state}_i, \text{state}_j)$ of said hidden Markov model of switching between two states i, j representing respectively a type of swimming are such that:

$P(\text{state}_i, \text{state}_j) \in [0.8;0.9999]$, when i is different from j; and $P(\text{state}_i, \text{state}_j) \in [0.0001;0.2]$, when i is equal to j.

11. The system as claimed in claim 5, wherein said analysis means is internal or external to the housing, and the triaxial accelerometer comprises wired or wireless transmission means configured to transmit measurements of the system to said analysis means.

12. The system as claimed in claim 5, further comprising display means fixed to the housing or a remote display means.

13. The system as claimed in claim 1, wherein said fixing means is configured to fasten the housing to the wrist, to the ankle, to the neck or to the head of the user.

14. The system as claimed in claim 1, wherein the analysis means is further configured to determine a type of swimming of the user from among a set of at least two swimming strokes selected from at least breaststroke, crawl, butterfly, and backstroke.

15. The system as claimed in claim 1, wherein values of the column vector $\underline{\mu}$ and the diagonal matrix $\Sigma$ have ranges of values which characterize one of the N types of swimming.

16. A method for observing a swimming activity of a person on the basis of measurements obtained from a motion sensor fixed in a waterproof manner to a part of the body of a user, characterized in that signals obtained from the motion sensor for at least one measurement axis of the motion sensor are analyzed to determine a type of swimming of the user as a function of time by using a hidden Markov model with N states corresponding respectively to N swimming types, the model being characterized by a column vector $\mu$ and a diagonal matrix $\Sigma$, both of which are representative of a state of the hidden Markov model corresponding to said swimming and having dimensions equal to the number of measurement axes of the motion sensor.

* * * * *